United States Patent
Takami

(10) Patent No.: US 9,677,250 B2
(45) Date of Patent: Jun. 13, 2017

(54) WORK VEHICLE AND METHOD OF CONTROLLING WORK VEHICLE

(71) Applicant: KOMATSU LTD., Tokyo (JP)

(72) Inventor: Yukio Takami, Komatsu (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 14/896,468

(22) PCT Filed: Oct. 5, 2015

(86) PCT No.: PCT/JP2015/078174
§ 371 (c)(1),
(2) Date: Dec. 7, 2015

(87) PCT Pub. No.: WO2016/043347
PCT Pub. Date: Mar. 24, 2016

(65) Prior Publication Data
US 2017/0096798 A1 Apr. 6, 2017

(51) Int. Cl.
*E02F 9/22* (2006.01)
*E02F 9/02* (2006.01)
(Continued)

(52) U.S. Cl.
CPC .............. *E02F 9/2228* (2013.01); *E02F 9/02* (2013.01); *E02F 9/0866* (2013.01);
(Continued)

(58) Field of Classification Search
CPC ........ E02F 9/2228; E02F 9/02; E02F 9/0866; E02F 9/2235; E02F 3/34; F01N 3/2066;
(Continued)

(56) References Cited

U.S. PATENT DOCUMENTS

| 6,336,518 B1 | 1/2002 | Matsuyama |
| 7,373,239 B2 * | 5/2008 | Kamado ............... E02F 9/2246 701/103 |

(Continued)

FOREIGN PATENT DOCUMENTS

| DE | 10 2005 022 420 A1 | 6/2006 |
| EP | 1 688 599 A1 | 8/2006 |

(Continued)

OTHER PUBLICATIONS

The Office Action for the corresponding Japanese application No. 2015-551903, issued on Apr. 19, 2016.
(Continued)

*Primary Examiner* — John Walters
(74) *Attorney, Agent, or Firm* — Global IP Counselors, LLP

(57) ABSTRACT

A work vehicle is provided with an engine, a variable displacement hydraulic pump, a hydraulic motor, a traveling apparatus, an exhaust treatment device, a reductant supply route, a controller, and an operation member. The variable displacement hydraulic pump is configured to discharge hydraulic oil when driven by the engine. The exhaust treatment device is configured to treat the exhaust from the engine. The reductant supply route supplies a reductant to the exhaust treatment device. The controller is configured to set an engine speed to a low idle when the reductant supply route gets into an abnormal state. The operation member is configured to indicate a change of a discharge capacity of the variable displacement hydraulic pump so that the travel speed of the traveling apparatus becomes a predetermined speed or greater when the reductant supply route gets into an abnormal state.

15 Claims, 6 Drawing Sheets

(51) Int. Cl.
 *E02F 9/08* (2006.01)
 *F01N 3/20* (2006.01)
 *E02F 3/34* (2006.01)

(52) U.S. Cl.
 CPC .......... *E02F 9/2235* (2013.01); *F01N 3/2066* (2013.01); *E02F 3/34* (2013.01); *F01N 2550/05* (2013.01); *F01N 2570/14* (2013.01); *F01N 2610/02* (2013.01)

(58) Field of Classification Search
 CPC . F01N 2550/05; F01N 2570/14; F01N 610/02
 USPC ........................................ 180/305, 306, 307
 See application file for complete search history.

(56) References Cited

U.S. PATENT DOCUMENTS

| | | | | |
|---|---|---|---|---|
| 8,316,636 | B2* | 11/2012 | Nakamura | B01D 53/90 60/277 |
| 8,646,255 | B2* | 2/2014 | Tsukada | E02F 9/00 60/295 |
| 9,353,669 | B2* | 5/2016 | Matsumoto | F02D 41/0235 |
| 2010/0050601 | A1 | 3/2010 | Nakamura | |
| 2014/0277995 | A1 | 9/2014 | Slaton et al. | |
| 2015/0098783 | A1 | 4/2015 | Hyodo et al. | |
| 2015/0098784 | A1* | 4/2015 | Hyodo | E02F 9/2066 414/685 |
| 2015/0300232 | A1 | 10/2015 | Matsumoto et al. | |

FOREIGN PATENT DOCUMENTS

| | | |
|---|---|---|
| EP | 2 151 528 A1 | 2/2010 |
| FR | 2 930 282 A3 | 10/2009 |
| JP | 4-131568 A | 5/1992 |
| JP | 11-350539 A | 12/1999 |
| JP | 2007-321671 A | 12/2007 |
| JP | 2007-321672 A | 12/2007 |
| JP | 2013-213396 A | 10/2013 |
| JP | 2015-71973 A | 4/2015 |
| JP | 2015-71974 A | 4/2015 |
| JP | 2015-71975 A | 4/2015 |
| JP | 2015-71976 A | 4/2015 |
| JP | 2015-161306 A | 9/2015 |
| WO | 2015025542 A1 | 2/2015 |

OTHER PUBLICATIONS

International Search Report for the corresponding international application No. PCT/JP2015/078174, issued on Dec. 15, 2015.
The extended European search report for the corresponding European application No. 15801976.0, issued on Mar. 13, 2017.

* cited by examiner

FIG. 6

WORK VEHICLE AND METHOD OF CONTROLLING WORK VEHICLE

CROSS-REFERENCE TO RELATED APPLICATIONS

This application is a U.S. National stage application of International Application No. PCT/JP2015/078174, filed on Oct. 5, 2015.

FIELD OF THE INVENTION

A work vehicle and a method of controlling the work vehicle are disclosed.

BACKGROUND INFORMATION

Japanese Laid-Open Patent Application Publication No. 2007-321671 discloses a work vehicle equipped with a hydraulic actuator driven by an engine. The work vehicle reduces the maximum engine speed to within a range the engine is capable of operating the hydraulic actuator as the amount of urea solution stored in the urea solution tank decreases.

SUMMARY

However, when the work vehicle travels normally even as the maximum engine speed is being reduced, the work vehicle still vents harmful nitrogen exhaust while traveling even when the outputted horsepower decreases to some extent. Thus recently, work vehicles are configured to set the engine speed to a low idle when the reductant supply route gets into an abnormal state, such as when the amount of urea solution stored in the urea solution tank is extremely low.

When the engine speed is set to a low idle, the work vehicle comes to a complete stop without being able to supply enough of a torque to the hydraulic actuator to make the work vehicle move. However, what is desirable is not for the vehicle to stop but to at least be able to move the work vehicle to a location that does not affect the operations of other work vehicles even when the reductant supply route gets into an abnormal state.

The exemplary embodiments of the present invention provide a work vehicle capable of traveling even when the engine speed is set to a low idle when the reductant supply route gets into an abnormal state.

A work vehicle according to a first aspect of the present invention includes an engine, a variable displacement hydraulic pump, a hydraulic motor, a traveling apparatus, an exhaust treatment device, a reductant supply route, a controller, and an operation member. The variable displacement hydraulic pump is configured to discharge hydraulic oil when driven by the engine. The hydraulic oil discharged from the variable displacement hydraulic pump drives hydraulic motor. The hydraulic motor drives the traveling apparatus. The exhaust treatment device is configured to treat the exhaust from the engine. The reductant supply route supplies a reductant to the exhaust treatment device. The controller is configured to set an engine speed to a low idle when the reductant supply route gets into an abnormal state. The operation member is configured to indicate a change of a discharge capacity of the variable displacement hydraulic pump so that the travel speed of the traveling apparatus becomes a predetermined speed or greater when the reductant supply route gets into an abnormal state.

The work vehicle may further include a hydraulic circuit, and a fixed displacement hydraulic pump. The hydraulic circuit is configured to change the discharge capacity of the variable displacement hydraulic pump. The fixed displacement hydraulic pump is driven by the engine and configured to supply hydraulic oil to the hydraulic circuit.

The hydraulic circuit may include an engine sensing valve configured to convert the hydraulic pressure of the hydraulic oil discharged from the fixed displacement hydraulic pump into a hydraulic pressure corresponding to the engine speed.

The hydraulic circuit may further include a pump capacity control cylinder, and a pump control valve. The pump capacity control cylinder is configured to change the capacity of the variable displacement hydraulic pump. The pump control valve is configured to supply hydraulic oil to the hydraulic chamber of the pump capacity control cylinder to actuate the pump capacity control cylinder.

The hydraulic circuit may further include a first hydraulic path and a second hydraulic path. The first hydraulic path connects the fixed displacement hydraulic pump and the engine sensing valve. The second hydraulic path connects the engine sensing valve and the pump control valve.

The hydraulic circuit further includes a first bypass hydraulic path branched from the first hydraulic path and connected to the second hydraulic path without passing through the engine sensing valve.

The hydraulic circuit may further include a first on-off valve provided on the first bypass hydraulic path.

The hydraulic circuit may further include a throttle provided on the first bypass hydraulic path between the first on-off valve and the second hydraulic path.

The work vehicle may further include an auxiliary hydraulic pump different from the fixed displacement hydraulic pump, the auxiliary hydraulic pump being driven by the engine, the auxiliary hydraulic pump configured to supply hydraulic oil to the hydraulic circuit. The hydraulic circuit may further include a second bypass hydraulic path connecting the auxiliary hydraulic pump and the first hydraulic path.

The hydraulic circuit may further include a second on-off valve provided on the second bypass hydraulic path.

The hydraulic circuit may be configured to change the discharge capacity of the variable displacement hydraulic pump when the operation member is operated so that the travel speed of the traveling apparatus becomes a predetermined speed or greater.

The flow path of the first on-off valve may be opened to increase the pressure of the hydraulic oil supplied to the pump control valve when the operation member is operated.

The flow path of the second on-off valve may be opened to increase pressure of the hydraulic oil supplied to the pump control valve when the operation member is operated.

The above-described hydraulic motor may be a variable displacement motor and the capacity of the hydraulic motor may be reduced when the operation member is operated.

A method of controlling a work vehicle according to a second aspect of the present invention includes a step of detecting whether the reductant supply route supplying reductant to the exhaust treatment device gets into an abnormal state; a step of setting the engine speed to a low idle when the reductant supply route gets into an abnormal state; and a step of changing the discharge capacity of the variable displacement hydraulic pump so that the travel speed of the traveling apparatus becomes a predetermined speed or greater when the reductant supply route gets into an abnormal state.

The work vehicle according to the first aspect, and the method of controlling the work vehicle according to the second aspect sets the engine speed to a low idle when the reductant supply route gets into an abnormal state, and changes the discharge capacity of the variable displacement hydraulic pump so that the vehicle speed becomes no less than a predetermined speed. Accordingly, the aforementioned work vehicle is capable of traveling even when the engine speed is set to a low idle when the reductant supply route gets into an abnormal state.

BRIEF DESCRIPTION OF DRAWINGS

FIG. 6 is illustrates a configuration of a modification to the hydraulic driving mechanism.

DESCRIPTION OF EXEMPLARY EMBODIMENTS

Overall Configuration

Figure 1:
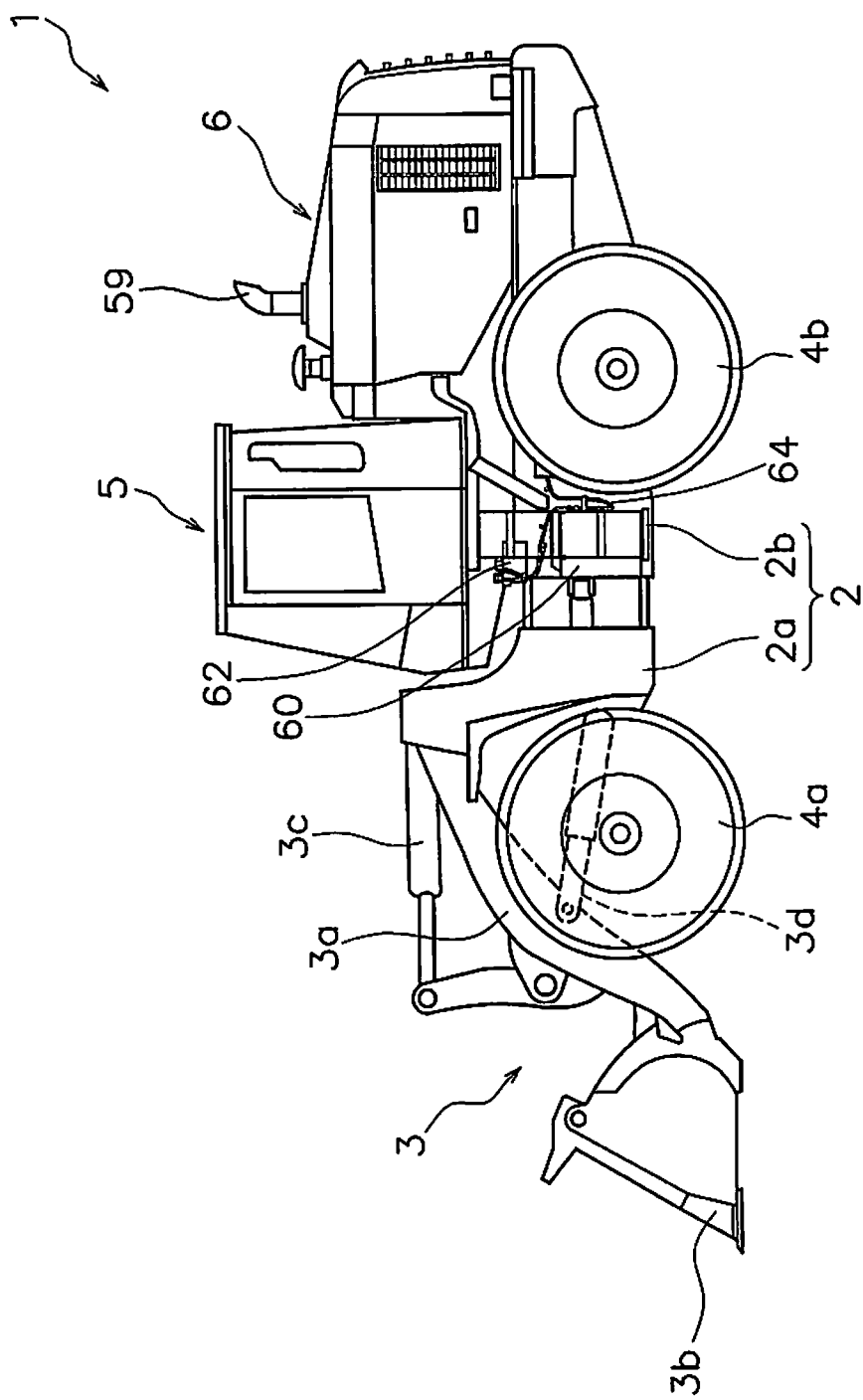
FIG. 1 is a side view of a work vehicle.

A side view of a work vehicle 1 according to an exemplary embodiment of the present invention is illustrated in FIG. 1. The work vehicle 1 is a wheel loader capable of traveling via tires 4a, 4b and carrying out the desired work using a working implement 3. The work vehicle 1 is provided with a vehicle frame 2, a working implement 3, tires 4a, 4b, and a cab 5.

The vehicle frame 2 contains a front frame 2a, and a rear frame 2b arranged behind the front frame. The front frame 2a, and the rear frame 2b are connected at the center of the vehicle frame 2 and are able to pivot horizontally thereat.

The working implement 3 and the pair of front tires 4a are installed on the front frame 2a. The hydraulic oil from a working-implement hydraulic pump 11 (refer to FIG. 3) drives the working implement 3. The working implement 3 is provided with a lift arm 3a mounted to the front of the front frame 2a, a bucket 3b installed on the tip end of the lift arm 3a, a lift cylinder 3d that drives the lift arm 3a, and a tilt cylinder 3c that drives the bucket 3b. The pair of front tires 4a are provided on the sides of the front frame 2a.

The pair of rear tires 4b, the cab 5, an engine compartment 6, a reductant tank 60, a supply module 62, and the like are provided on the rear frame 2b. The pair of rear tires 4b are provided on the sides of the rear frame 2b. The cab 5 is installed on the upper part of the vehicle frame 2. Control units, such as a steering handle, an accelerator pedal, and an operation member 70 (refer to FIG. 3), a display unit (not shown) for displaying various kinds of information, such as the speed, an operator seat, and the like are installed in the cab 5. The engine compartment 6 is arranged behind the cab 5.

The reductant tank 60, and the supply module 62 are arranged beside the cab 5 (on the left side in the example illustrated in FIG. 1), and in front of the engine compartment 6. The reductant tank 60 stores the reductant injected by a later-described reductant injector 54. The reductant injector 54 is arranged in the engine compartment 6. The supply module 62 is a pump for sending the reductant from the reductant tank 60 to the reductant injector 54. Reductant supply pipes 64 are provided between the reductant tank 60, the supply module 62, and the reductant injector 54 for sending the reductant.

Figure 2:
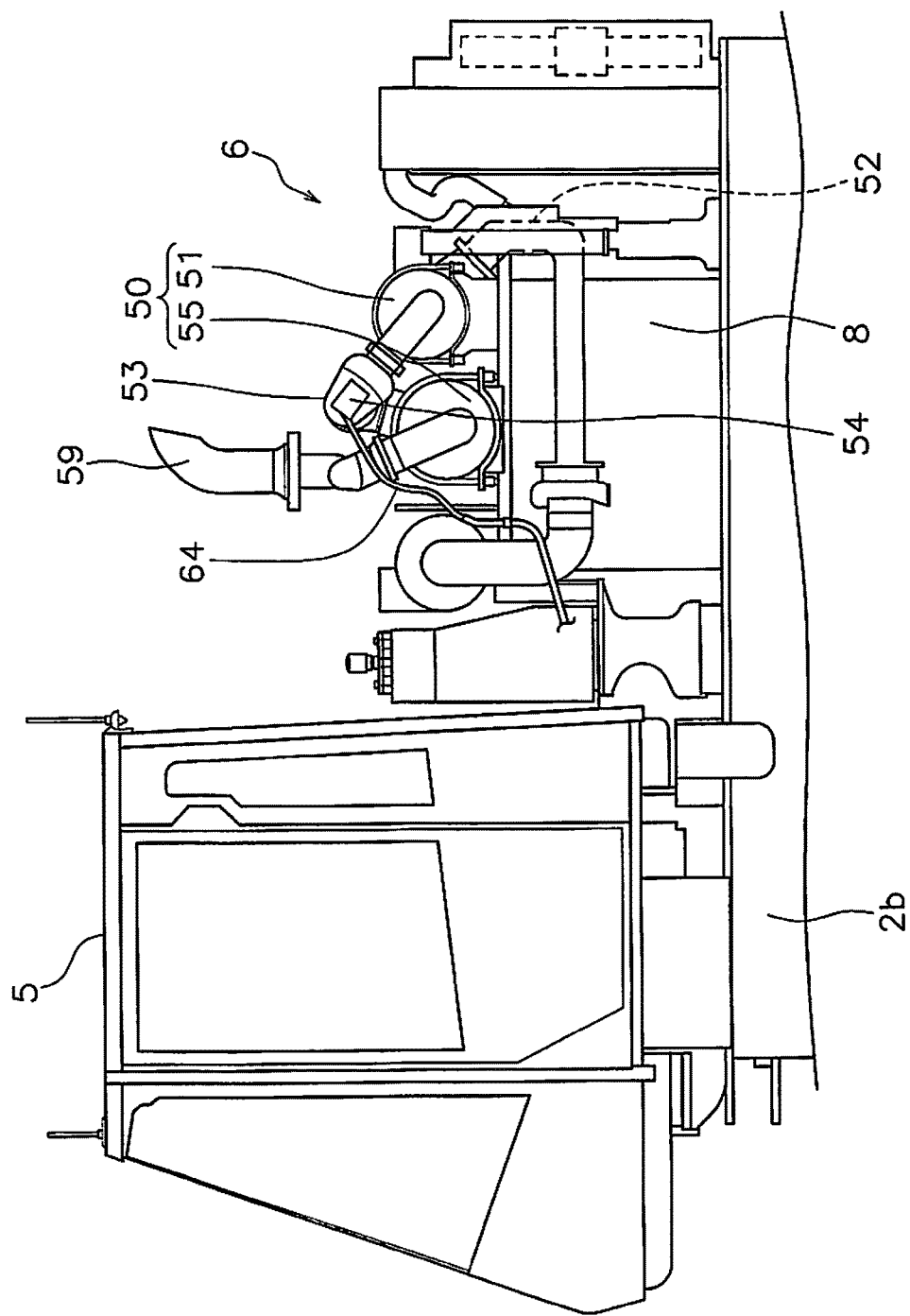
FIG. 2 is a side view illustrating a configuration of an inside of the engine compartment.

FIG. 2 is a side view illustrating a configuration of the inside of the engine compartment 6. As illustrated in FIG. 2, the engine 8, and an exhaust treatment device 50 are arranged inside the engine compartment 6. The exhaust treatment device 50 contains a first exhaust treatment device 51 and a second exhaust treatment device 55.

The engine 8 is a so-called diesel engine. The engine 8 drives the above-described tires 4a, 4b and the hydraulic pumps 9, 11 (refer to FIG. 3). The engine 8 is supported on the rear frame 2b.

The first exhaust treatment device 51 is arranged above the engine 8. The first exhaust treatment device 51 treats the exhaust from the engine 8. The first exhaust treatment device 51 is, for example, a diesel oxidation catalyst (DOC) device. The DOC device removes the hydrocarbon (HC) and the carbon monoxide (CO) in the exhaust from the engine 8. The first exhaust treatment device 51 is a roughly circular cylinder. The first exhaust treatment device 51 is arranged such that the lengthwise direction thereof follows the width of the vehicle. The first exhaust treatment device 51 is connected to the engine 8 via a first connecting pipe 52.

The second exhaust treatment device 55 is arranged above the engine 8 adjacent to the first exhaust treatment device 51. The second exhaust treatment device 55 treats the exhaust from the engine 8. The second exhaust treatment device 55 is, for example, a selective catalytic reduction (SCR) device. The SCR device uses a reductant to remove nitrogen oxides (NOx) in the exhaust from the engine 8. The second exhaust treatment device 55 is a roughly circular cylinder. The second exhaust treatment device 55 is arranged such that the lengthwise direction thereof follows the width of the vehicle. The second exhaust treatment device 55 is connected to the first exhaust treatment device 51 via a second connecting pipe 53.

The second connecting pipe 53 is arranged above the second exhaust treatment device 55. A reductant injector 54 is installed on the second connecting pipe 53. The reductant injector 54 is connected to a reductant supply pipe 64. The reductant injector 54 injects the reductant supplied from the reductant tank 60 into the second connecting pipe 53. The reductant may be an aqueous solution of urea. The second connecting pipe 53 mixes the reductant with the exhaust from the engine 8.

Figure 3:
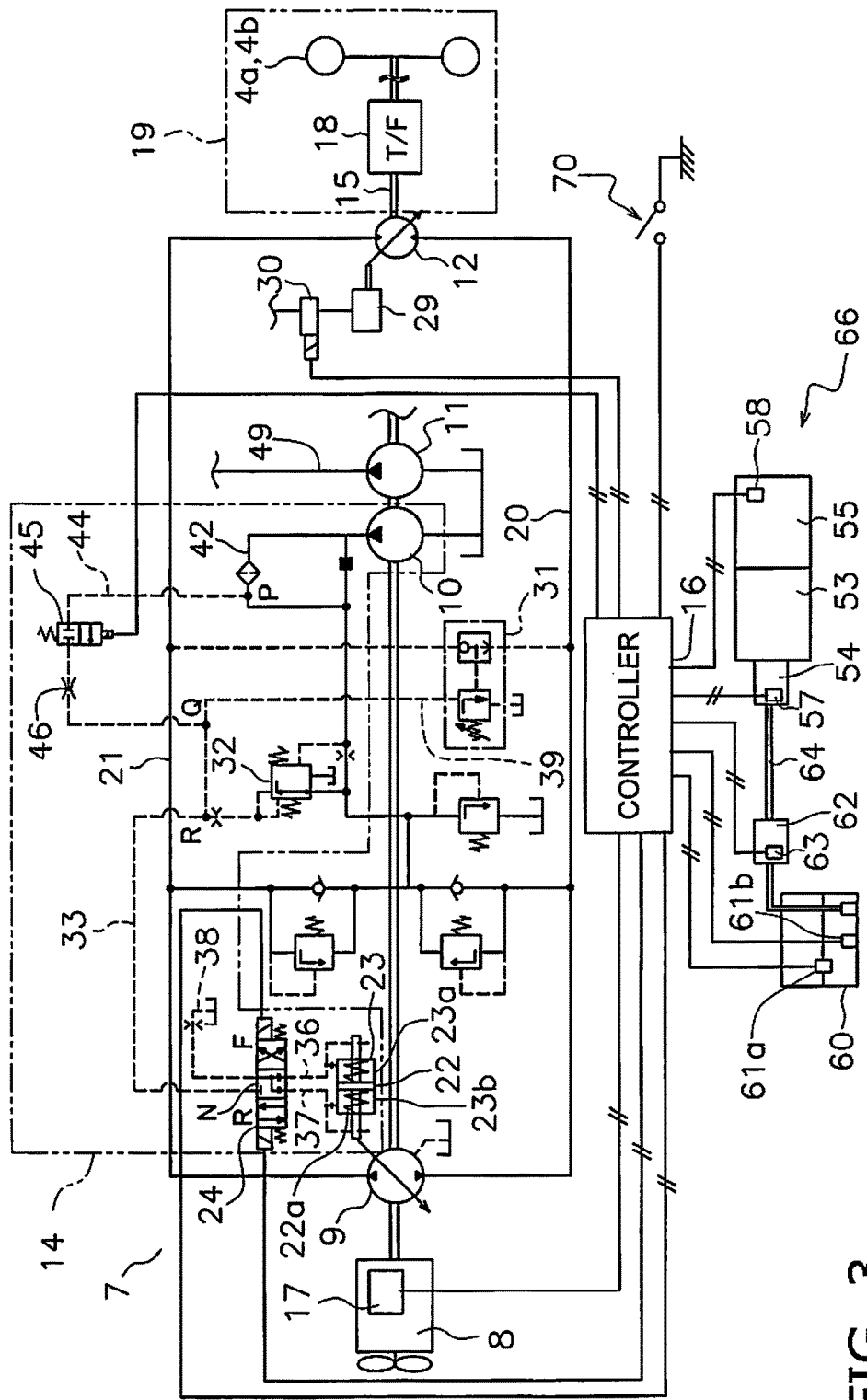
FIG. 3 illustrates a configuration of a hydraulic driving mechanism provided to the work vehicle.

In the description that follows, the route supplying the reductant from the reductant tank 60 to the second exhaust treatment device 55 is named the reductant supply route 66 (refer to FIG. 3). That is, the reductant supply route 66 includes the reductant tank 60, the supply module 62, the reductant supply pipe 64, the reductant injector 54, the second connecting pipe 53, and the second exhaust treatment device 55.

An exhaust pipe 59 is connected to the second exhaust treatment device 55. The exhaust pipe 59 is arranged above the second exhaust treatment device 55. Above the second exhaust treatment device 55, the exhaust pipe 59 extends along the width of the vehicle, and bends upward. As illustrated in FIG. 1, the tip end portion of the exhaust pipe 59 protrudes upward from the upper surface of the engine compartment 6. The tip end portion of the exhaust pipe 59 curves rearward.

Hydraulic Driving Mechanism

A hydraulic driving mechanism 7 is mounted on the vehicle frame 2 to drive the tires 4a, 4b, and the working implement 3. A configuration of the hydraulic driving mechanism 7 is described below on the basis of FIG. 3. The hydraulic driving mechanism 7 contains, primarily, the engine 8, a hydraulic pump for traveling (travel hydraulic pump or a variable displacement hydraulic pump) 9, a charge pump (or a fixed displacement hydraulic pump) 10, a working-implement hydraulic pump 11, a hydraulic motor for traveling (travel hydraulic motor or a hydraulic motor) 12, the traveling apparatus 19, a controller 16, and adopts the so-called hydrostatic transmission (HST) system.

The output torque generated by the engine 8 is transmitted to the travel hydraulic pump 9, the charge pump 10, and the working-implement hydraulic pump 11, and the like. A fuel injector 17 is provided to the engine 8 for controlling the output torque and the speed of the engine 8. In the present exemplary embodiment, the speed signifies the number of rotations of the output shaft of the engine 8 in a given unit of time. Accordingly, the speed of the engine 8 is a value that does not depend on the rotation direction of said output shaft. The fuel injector 17 adjusts the amount of fuel injected on the basis of a commanded speed signal from the controller 16 to the engine 8; the commanded speed signal is adjusted depending on an amount the accelerator pedal is operated (referred to below as an "accelerator operation amount").

The travel hydraulic pump 9 is a variable displacement hydraulic pump that changes the capacity and discharge direction of the hydraulic oil therefrom in accordance with a change in the tilt angle of the swashplate. The engine 8 drives the travel hydraulic pump 9 which thereby discharges the hydraulic oil. The hydraulic oil discharged from the travel hydraulic pump 9 is sent to the travel hydraulic motor 12 through hydraulic circuits for traveling (travel circuits) 20, 21. The travel circuit 20 (referred to below as the "forward travel circuit 20") is a flow path supplying the travel hydraulic motor 12 with hydraulic oil so that driving the travel hydraulic motor 12 causes the vehicle to move forward. The travel circuit 21 (referred to below as the "reverse travel circuit 21") is a flow path supplying the travel hydraulic motor 12 with hydraulic oil so that driving the travel hydraulic motor 12 causes the vehicle to move in reverse.

Varying the tilt angle of the swashplate in the travel hydraulic pump 9 connect a pump control circuit (or a hydraulic circuit) 14 to the travel hydraulic pump 9. The pump control circuit 14 changes the discharge capacity of the travel hydraulic pump 9. The pump control circuit 14 contains a pump capacity control cylinder 23, first and second pilot circuits 36, 37, a pump control valve 24, a drain circuit 38, a main pilot circuit (or a second hydraulic path) 33, and engine sensing valve 32, a charge circuit (or a first hydraulic path) 42, a first bypass hydraulic path 44, a first on-off valve 45, a throttle 46, and a charge pump 10.

The pump capacity control cylinder 23 moves a piston 22 in accordance with the pressure of the hydraulic oil supplied thereto. A spring 22a is installed on the piston 22. The pump capacity control cylinder 23 includes a first hydraulic chamber 23a and a second hydraulic chamber 23b; the location of the piston 22 changes depending on the balance between the force of the spring, and a pressure differential between the hydraulic pressures inside the first hydraulic chamber 23a and the second hydraulic chamber 23b, respectively. The piston 22 is connected to the swashplate in the travel hydraulic pump 9, and the movement of the piston 22 changes the tilt angle of the swashplate in the travel hydraulic pump 9. Hereby, the pump capacity control cylinder 23 is able to vary the capacity and the discharge direction of the hydraulic oil from the travel hydraulic pump 9.

The pump control valve 24 is an electromagnetic control valve that actuates the pump capacity control cylinder 23 on the basis of a command signal from the controller 16. The pump control valve 24 is capable of controlling the direction in which the hydraulic oil is supplied to the pump capacity control cylinder 23 on the basis of a command signal from the controller 16. Consequently, the controller 16 may change the discharge direction of the hydraulic oil from the travel hydraulic pump 9 by controlling the pump control valve 24 electrically. The pump control valve 24 may be switched between a forward-travel state F, a reverse-travel state R and a neutral state N.

In the forward-travel state F, the pump control valve 24 links later described first pilot circuit 36 and the main pilot circuit 33, and connects the second pilot circuit 37 and the drain circuit 38. The first pilot circuit 36 is connected to the first hydraulic chamber 23a in the pump capacity control cylinder 23. The second pilot circuit 37 is connected to the second hydraulic chamber 23b in the pump capacity control cylinder 23. Therefore, when the pump control valve 24 is in the forward-travel state F, hydraulic oil is supplied to the first hydraulic chamber 23a via the main pilot circuit 33, and the first pilot circuit 36, and discharged from the second hydraulic chamber 23b. Hereby, the tilt angle in the travel hydraulic pump 9 changes to an orientation that increases the capacity in the forward travel circuit 20.

In addition, during the reverse-travel state R, the pump control valve 24 links the second pilot circuit 37 and the main pilot circuit 33, and connects the first pilot circuit 36 and the drain circuit 38. Therefore, when the pump control valve 24 is in the reverse-travel state R, hydraulic oil is supplied to the second hydraulic chamber 23b via the main pilot circuit 33 and the second pilot circuit 37. Hereby, the tilt angle in the travel hydraulic pump 9 changes to an orientation that increases the capacity in the reverse travel circuit 21.

The first pilot circuit 36 and the second pilot circuit 37 are connected to the drain circuit 38 in the neutral state N of the pump control valve 24. In this case, the travel hydraulic pump 9 does not discharge hydraulic oil to either of the forward travel circuit 20 or the reverse travel circuit 21. In other words, at this point the discharge capacity of the travel hydraulic motor 12 is zero.

The charge pump 10 is a fixed displacement hydraulic pump that discharges hydraulic oil when driven by the engine 8. The charge pump 10 supplies the hydraulic oil to the pump control valve 24 that actuates the pump capacity control cylinder 23. The hydraulic oil discharged from the charge pump 10 is normally supplied to the pump control valve 24 through a charge circuit 42, an engine sensing valve 32, and the main pilot circuit 33. The charge circuit 42 is a hydraulic path connecting the charge pump 10 and the engine sensing valve 32. The main pilot circuit 33 is a hydraulic path connecting the engine sensing valve 32 and the pump control valve 24.

The hydraulic driving mechanism 7 further includes a first bypass hydraulic path 44 that connects the main pilot circuit 33 and the charge circuit 42. The first bypass hydraulic path 44 branches from the charge circuit 42 and connects to the main pilot circuit 33 without passing through the engine sensing valve 32. The first bypass hydraulic path 44 connects to the charge circuit 42 at a branch point P. The first bypass hydraulic path 44 connects to the main pilot circuit 33 at a branch point R.

The first bypass hydraulic path 44 is provided with a first on-off valve 45, and a throttle 46. The flow path of the first on-off valve 45 is normally closed. That is, the first on-off valve 45 is normally closed. When the controller 16 detects that the operation member 70 is turned on (i.e., is operated), the controller 16 sends a command signal that opens the flow path of the first on-off valve 45. That is the first on-off valve 45 opens. At this point, the hydraulic oil discharged from the charge pump 10 flows from the charge circuit 42 through the first bypass circuit 44 into the main pilot circuit 33.

The throttle 46 is provided between the first on-off valve 45 and the main pilot circuit 33 to ensure the hydraulic pressure in the main pilot circuit 33 is at or above a predetermined pressure when the first on-off valve 45 opens. Note that the throttle 46 may also be provided between the first on-off valve 45 and the charge circuit 42. The throttle 46 is described later in detail.

Figure 4:
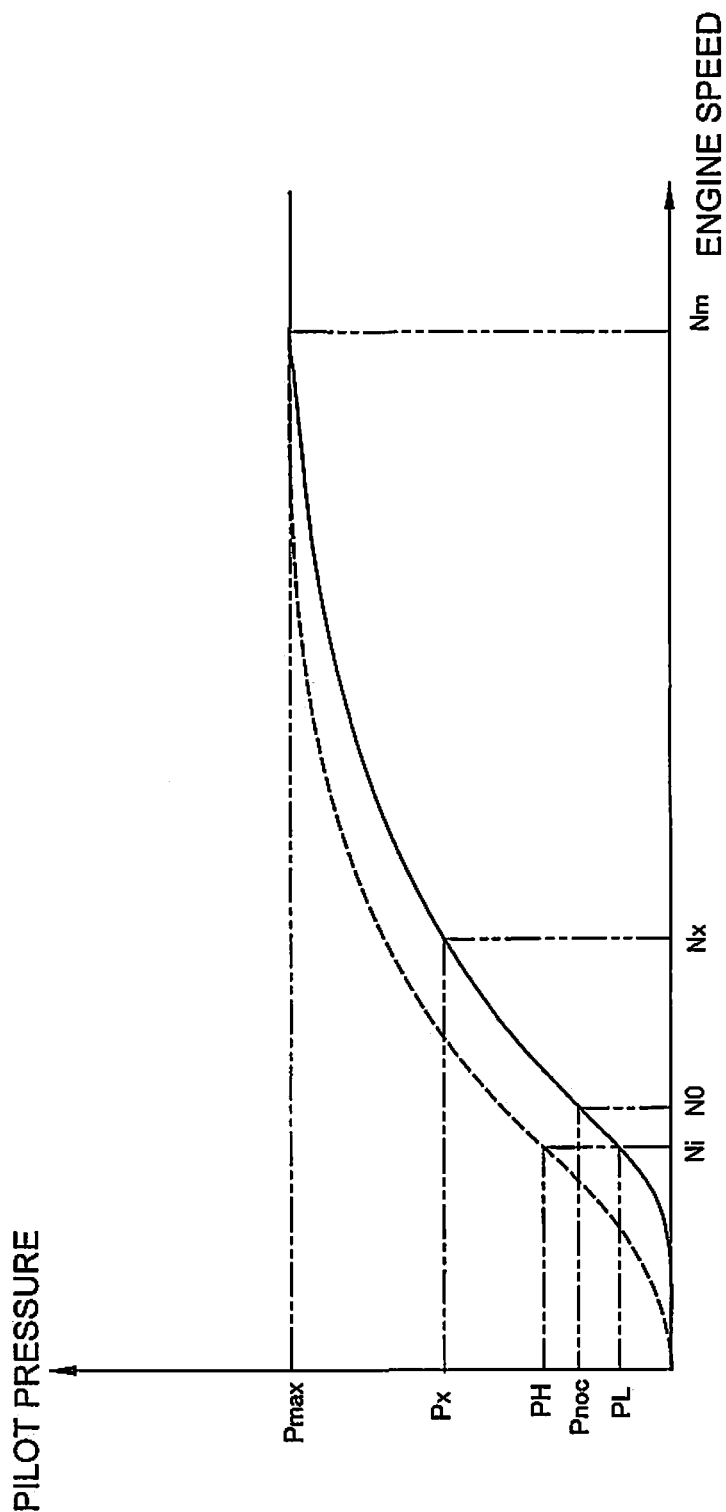
FIG. 4 is a graph illustrating the relationship between the engine speed and the pilot pressure in the engine sensing valve.

The engine sensing valve 32 converts the hydraulic pressure of the hydraulic oil discharged from the charge pump 10 into a hydraulic pressure that corresponds to the engine speed and applies the converted hydraulic pressure to the main pilot circuit 33. The engine sensing valve 32 changes the pressure in the main pilot circuit 33 (i.e., the pilot pressure) in accordance with the engine speed. FIG. 4 is a graph illustrating the relationship between the engine speed and the pilot pressure in the engine sensing valve 32. In FIG. 4 the solid line represents the relationship between the engine speed and the pilot pressure when the first on-off valve 45 is closed. The dotted line represents the relationship between the engine speed and the pilot pressure when the first on-off valve 45 is open.

As illustrated by the solid line in FIG. 4, when the engine speed increases the engine sensing valve 32 increases the pilot pressure. The variable Pnoc in FIG. 4 is the minimum required pilot pressure needed in the pump capacity control cylinder 23 to move the piston 22. In other words, when the pilot pressure is greater than Pnoc, the pressure differential between the hydraulic pressure inside the first hydraulic chamber 23a and the hydraulic pressure inside the second hydraulic chamber 23b is greater than the biasing force of the spring 22a and the piston 22 moves. The low idle speed Ni of the engine 8 during normal operation (i.e., the engine speed when there is no load) is smaller than the engine speed N0 corresponding to Pnoc. Therefore, the work vehicle 1 will not travel during normal operation when the accelerator operation amount is zero.

When the engine speed is Nx (N0<Nx<Nm) illustrated in FIG. 4, the piston 22 moves to a location where the pilot pressure Px corresponding to the engine speed Nx and the spring force of the spring 22a are balanced thereby setting the capacity of the travel hydraulic pump 9. When the engine speed is greater than Nm illustrated in FIG. 4, a later-described cut-off valve 31 operates to thereby set the pilot pressure at a maximum value Pmax. At this point, the piston 22 moves up to the location where the pilot pressure Pmax and the spring force of the spring 22a are balanced, thereby setting the capacity of the travel hydraulic pump 9. In this manner, the engine sensing valve 32 changes the pilot pressure, to thereby increase or decrease the capacity of the travel hydraulic pump 9 as above described.

When the first on-off valve 45 is open, the pilot pressure increases to more than when the first on-off valve 45 is closed as illustrated by the dotted line in FIG. 4. That is, the pressure of the hydraulic oil supplied to the pump control valve 24 increases. In particular, the pilot pressure PH, which is the pilot pressure when the engine speed is the low idle speed Ni is greater than the above-described Pnoc. The work vehicle 1 is thus able to travel. Note that, if Cp is taken as the capacity of the travel hydraulic pump 9 when the vehicle speed (the travel speed of the tires 4a, 4b) increases to a predetermined speed v or greater while the capacity of the later-described travel hydraulic motor 12 is taken as a predetermined capacity Cm, then the pilot pressure PH is the pilot pressure when the capacity of the travel hydraulic pump 9 is Cp. The diameter of the throttle 46 is designed so that the pilot pressure may be set to PH when the engine speed is Ni.

In FIG. 3, a cut-off circuit 39, which is connected to the cut-off valve 31, is connected to the first bypass hydraulic path 44. When viewed from the perspective of the flow direction of the hydraulic oil, the cut-off circuit 39 is connected to the first bypass hydraulic path 44 at a branch point Q further downstream from the first on-off valve 45 and the throttle 46. The cut-off circuit 39 connects to the main pilot circuit 33 via the first bypass hydraulic path 44 between the branch points Q, R.

The cut-off valve 31 is a pressure reducing valve that reduces the pilot pressure in the pump capacity control cylinder 23 to an established pressure by balancing the hydraulic pressure in the travel circuits 20, 21 (referred to below as the "travel circuit hydraulic pressure") and the spring force. The cut-off valve 31 limits the pilot pressure to the maximum pilot pressure Pmax in FIG. 4. The cut-off valve 31 is configured to reduce the pilot pressure supplied to the pump capacity control cylinder 23 when the travel circuit hydraulic pressure is at or exceeds an established cut-off pressure value to thereby ensure that the travel circuit hydraulic pressure does not exceed the cut-off pressure value.

The engine 8 drives the working-implement hydraulic pump 11. The hydraulic oil discharged from the working-implement hydraulic pump 11 is sent to the tilt cylinder 3c, the lift cylinder 3d, and the like (refer to FIG. 1) via the working-implement circuit 49, and drives the tilt cylinder 3c, the lift cylinder 3d, and the like.

The travel hydraulic motor 12 is a variable displacement hydraulic motor that changes the capacity thereof in accordance with a change in the tilt angle of the swashplate. The hydraulic oil supplied to the travel hydraulic motor 12 from the travel hydraulic pump 9 via the travel circuits 20, 21 drives the travel hydraulic motor 12. Hereby, the travel hydraulic motor 12 generates the driving power that causes the vehicle to move.

Depending on the discharge direction of the hydraulic oil from the travel hydraulic pump 9, the travel hydraulic motor 12 changes the drive direction to the forward direction or the reverse direction. More specifically, the travel hydraulic motor 12 is driven in a direction that causes the vehicle to move forward when the hydraulic oil is supplied via the forward travel circuit 20. The travel hydraulic motor 12 is driven in a direction that causes the vehicle to move in reverse when the hydraulic oil is supplied via the reverse travel circuit 21.

A motor cylinder 29, and a motor control valve 30 are provided in the travel hydraulic motor 12. The motor cylinder 29 controls the tilt angle in the travel hydraulic motor 12, and the motor control valve 30 controls the motor cylinder 29. The motor control valve 30 is an electromagnetic control valve controlled on the basis of a control signal from the controller 16. The controller 16 is capable of changing the capacity of the travel hydraulic motor 12 as desired by controlling the motor cylinder 29.

The traveling apparatus 19 contains a drive shaft 15, a transformer 18, and the tires 4a, 4b. The drive shaft 15 is connected to the travel hydraulic motor 12. The transformer 18 is connected to the drive shaft 15. Drive wheels, to which the tires 4a, 4b are mounted, are connected to the transformer 18. The driving power from the travel hydraulic motor 12 is transmitted to the tires 4a, 4b via the drive shaft 15 and the transformer 18 (refer to FIG. 1). The travel hydraulic motor 12 can drive the traveling apparatus 19 in this manner.

The reductant supply route 66 may be provided with sensors 63, 57, 58 for detecting whether, for instance, the supply module 62, the reductant injector 54, and the second exhaust treatment device 55 respectively are operating normally. The information detected by the sensors 63, 57, 58 on whether or not the supply module 62, reductant injector 54, and the second exhaust treatment device 55 are operating normally may be sent to the controller 16 as detection signals. The reductant tank 60 may also be provided with, for instance, a level sensor 61a for measuring the amount of reductant remaining, and a reductant measuring sensor 61b for measuring the quality of the reductant. The data detected by the sensors 61a, 61b related to the amount remaining and the quality of the reductant may be sent to the controller 16 as detection signals.

The controller 16 is any electronic control unit including, for instance, a CPU and various kinds of memory. The controller 16 is programmed to electrically control the various electromagnetic valves, and the fuel injector 17 on the basis of the signals output from the sensors. Hereby, the controller 16 controls the engine speed, the motor capacity, and the like. In the work vehicle 1, the traction force and the vehicle speed are continuously varied so that gear shifting occurs automatically between a vehicle speed of zero to a maximum speed without a gear shifting operation.

The controller 16 determines that the reductant supply route 66 gets into an abnormal state when the data from the sensors 63, 57, 58, 61a, 61b matches the condition that the engine speed must be set to a low idle speed Ni in compliance with emission control regulations.

More specifically, for instance, the controller 16 may determine whether or not at least one of the devices among the supply module 62, the reductant injector 54, and the second exhaust treatment device 55 is operating normally on the basis of the data from the sensors 63, 57, 58. The controller 16 may also determine whether or not the quality of the reductant, or amount of reductant remaining falls below a predetermined range on the basis of the data from the sensors 61a, 61b. Furthermore, the controller 16 may determine that the reductant supply route 66 gets into an abnormal state when at least one of the aforementioned devices is not operating normally, or when the quality of the reductant or amount of reductant remaining falls below a predetermined range.

The controller 16 may output a commanded speed signal to the fuel injector 17 to set the engine speed to the low idle speed Ni on determining that the reductant supply route 66 gets into an abnormal state. Hereby the engine speed decreases to a low idle.

The operator may operate the operation member 70 when desiring the vehicle to travel under the condition that the engine speed is in a low idle due to the reductant supply route 66 getting into an abnormal state. The operation member 70 may be, for instance a switch that the operator turns on when desiring the vehicle to travel. The on or off signal from the operation member 70 is sent to the controller 16.

When the operation member 70 is turned on (i.e., the operation member 70 has been operated), the controller 16 controls the first on-off valve 45 so that the first on-off valve 45 opens. That is, the operation member 70 indicates a change of the discharge capacity of the travel hydraulic pump 9 to the capacity Cp to establish the vehicle speed at or above a predetermined speed v when the reductant supply route 66 gets into an abnormal state. When the operation member 70 is off, the controller 16 controls the first on-off valve 45 so that the first on-off valve 45 closes.

Operation of the Work Vehicle

Figure 5:
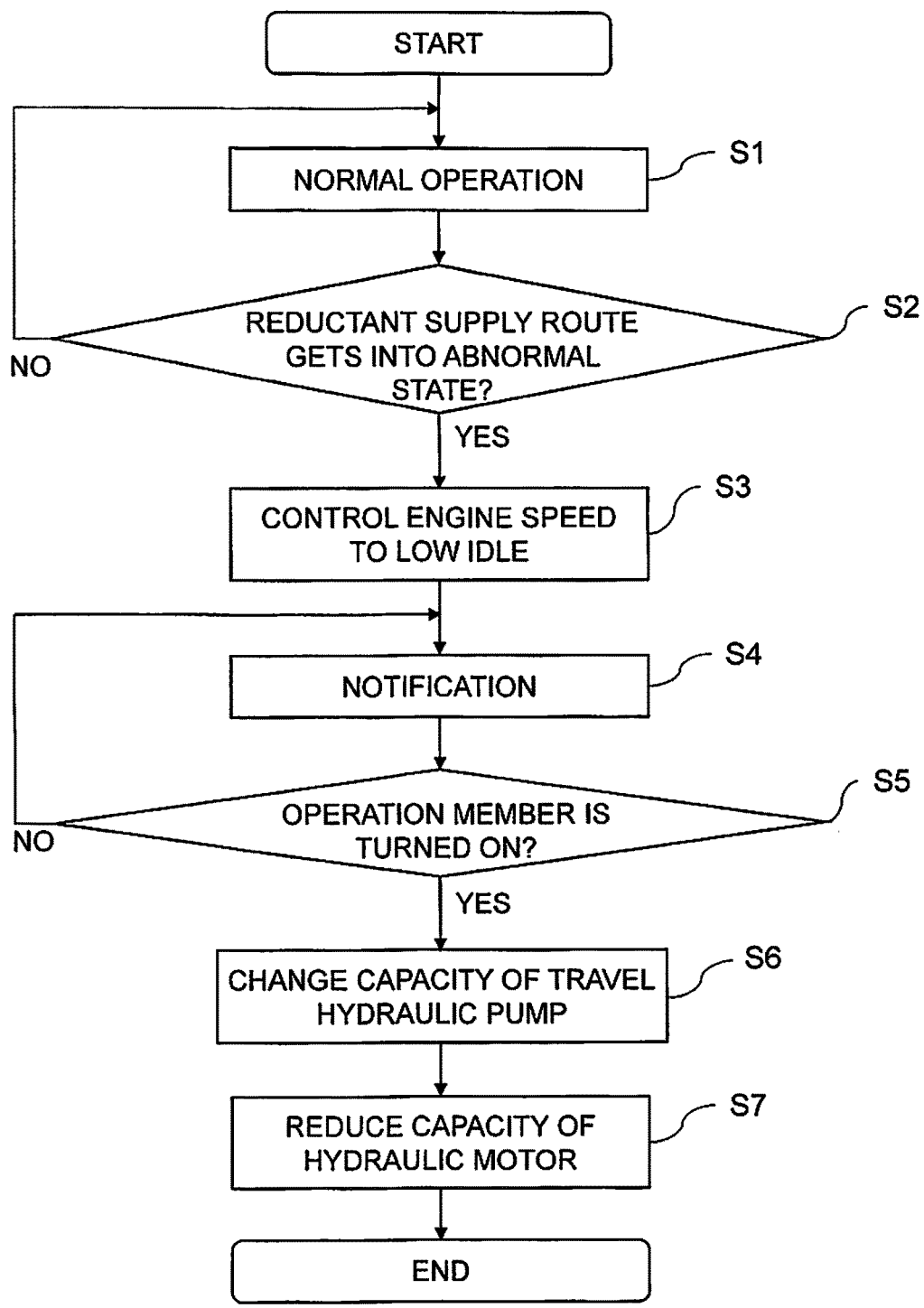
FIG. 5 is a flowchart illustrating the operations of a work vehicle according to the exemplary embodiments.

FIG. 5 is a flowchart illustrating the operations of a work vehicle 1 according to the exemplary embodiments. First, the work vehicle 1 operates normally in step 1. More specifically, the controller 16 controls the work vehicle 1 so that the engine 8 drives the travel hydraulic pump 9, and so that the hydraulic oil discharged from the travel hydraulic pump 9 drives the travel hydraulic motor 12.

Using the data from the sensors 61a, 61b, 63, 57, 58, in step 2 the controller 16 determines whether or not the reductant supply route 66 gets into an abnormal state. Control returns to step 1 when the reductant supply route 66 is not in an abnormal state (NO, at step 2).

When the reductant supply route 66 gets into an abnormal state (YES, at step 2), control moves to step 3 where the controller 16 controls the fuel injector 17 so that the engine speed becomes a low idle speed Ni. Hereby the engine speed decreases to a low idle. In step 4, the controller 16 directs a display unit or the like mounted inside the cab 5 to output a notification of the abnormal state in the reductant supply route 66.

In step 5, the controller 16 determines whether or not the operation member 70 is turned on (is operated). Control returns to step 4 when the operation member 70 is off (NO, at step 5).

In step 6, when the operation member 70 is turned ON (YES, at step 5), the controller 16 controls the first on-off valve 45 so that the first on-off valve 45 opens, to thereby increase the pilot pressure from PL to PH illustrated in FIG. 4. As a result, the discharge capacity of the travel hydraulic pump 9 increases from zero to a predetermined value Cp corresponding to PH. That is, the controller 16 changes the discharge capacity of the travel hydraulic pump 9 to the aforementioned predetermined value Cp.

In step S7, the controller 16 controls the capacity of the travel hydraulic motor 12 so that the capacity of the travel hydraulic motor 12 changes to the above-described capacity Cm to cause the vehicle speed to become a predetermined speed v or greater when the discharge capacity of the travel hydraulic pump 9 is a predetermined value Cp. Because the travel hydraulic pump 9 has a small discharge capacity Cp, the capacity Cm is preliminarily defined as a small so that the work vehicle 1 can travel. Consequently, under normal circumstances, in step 7 the controller 16 reduces the discharge capacity of the travel hydraulic pump 9.

Note that, the discharge capacity Cp of the travel hydraulic pump 9 is defined to match the capacity Cm of the travel hydraulic motor 12 which establishes the vehicle speed at or above the predetermined speed v in step 7, and therefore it can be considered that in step 6 the controller 16 changes the discharge capacity of the travel hydraulic pump 9 to establish the vehicle speed at or above the predetermined speed v. In other words, it can be said that in step 6 the pump control circuit 14 changes the discharge capacity of the travel hydraulic pump 9 to establish the vehicle speed at or above the predetermined speed v.

Operation Effects

Next, the operation effects of the exemplary embodiment are described. When the reductant supply route 66 gets into an abnormal state (step 2 in FIG. 5), the controller 16 according to the exemplary embodiment establishes an engine speed that is the low idle speed Ni (step 3 in FIG. 5), and changes the discharge capacity of the travel hydraulic pump 9 to the above-described Cp so that the vehicle speed becomes the predetermined speed or greater (step 6 in FIG. 5). Therefore, the work vehicle 1 is capable of travel even when the engine speed is set to a low idle when the reductant supply route 66 gets into an abnormal state.

The hydraulic driving mechanism 7 according to the exemplary embodiment includes an operation member 70. When the reductant supply route 66 gets into an abnormal state the operation member 70 can direct changing the discharge capacity of the travel hydraulic pump 9 to the above-described capacity Cp so that the vehicle speed becomes the predetermined speed v or greater. Accordingly, the operator may operate the operation member 70 when the reductant supply route 66 gets into an abnormal state to intentionally cause the work vehicle 1 to move.

The aforementioned hydraulic driving mechanism 7 is driven by the engine 8, and includes a charge pump 10, which is a fixed displacement hydraulic pump, that discharges hydraulic oil to a charge circuit 42, and an engine sensing valve 32 that converts the hydraulic pressure of the hydraulic oil discharged from the charge pump 10 to a hydraulic pressure corresponding to the engine speed. Hereby, the discharge capacity of the travel hydraulic pump 9 may be adjusted in accordance with the accelerator operation amount.

The aforementioned hydraulic driving mechanism 7 includes a first bypass hydraulic path 44 branched from the charge circuit 42 and linked to the main pilot circuit 33 without passing through the engine sensing valve 32. Therefore, the hydraulic pressure applied to the main pilot circuit 33 may be greater than the hydraulic pressure output from the engine sensing valve 32 that corresponds to the engine speed. Thus, operating the operation member 70 can change the discharge capacity of the travel hydraulic pump 9 to the capacity Cp. The first bypass hydraulic path 44 is provided with a first on-off valve 45, the flow path on which is opened when the operation member 70 is operated. Hereby, the discharge capacity of the travel hydraulic pump 9 can be changed to the capacity Cp when the operation member 70 is operated.

The first bypass hydraulic path 44 is provided with a throttle 46. Adjusting the diameter of the throttle 46 allows the discharge capacity of the travel hydraulic pump 9 to be changed to the capacity Cp needed to set the vehicle speed to at or above the predetermined speed v even when the engine speed is at the low idle speed Ni.

The controller 16 reduces the discharge capacity of the travel hydraulic motor 12 to the capacity Cm when the operation member 70 is operated (YES, in step 5 in FIG. 5). This thereby allows setting the vehicle speed to the predetermined speed v or greater.

Here ends the description of one exemplary embodiment of the present invention; the present invention is not limited to these descriptions but may be modified in various ways and so far as the modifications do not deviate from the spirit of the present invention.

Modification Examples

Although a wheel loader is provided as an example of the work vehicle 1 in the above exemplary embodiment, the work vehicle 1 may be any other work vehicle, such as a bulldozer.

The above exemplary embodiment provides a DOC as an example of the first exhaust treatment device 51, and an SCR as an example of the second exhaust treatment device 55. However, instead of a DOC, a diesel particulate collection filter (DPF) device may be used as the first exhaust treatment device 51.

Figure 6:
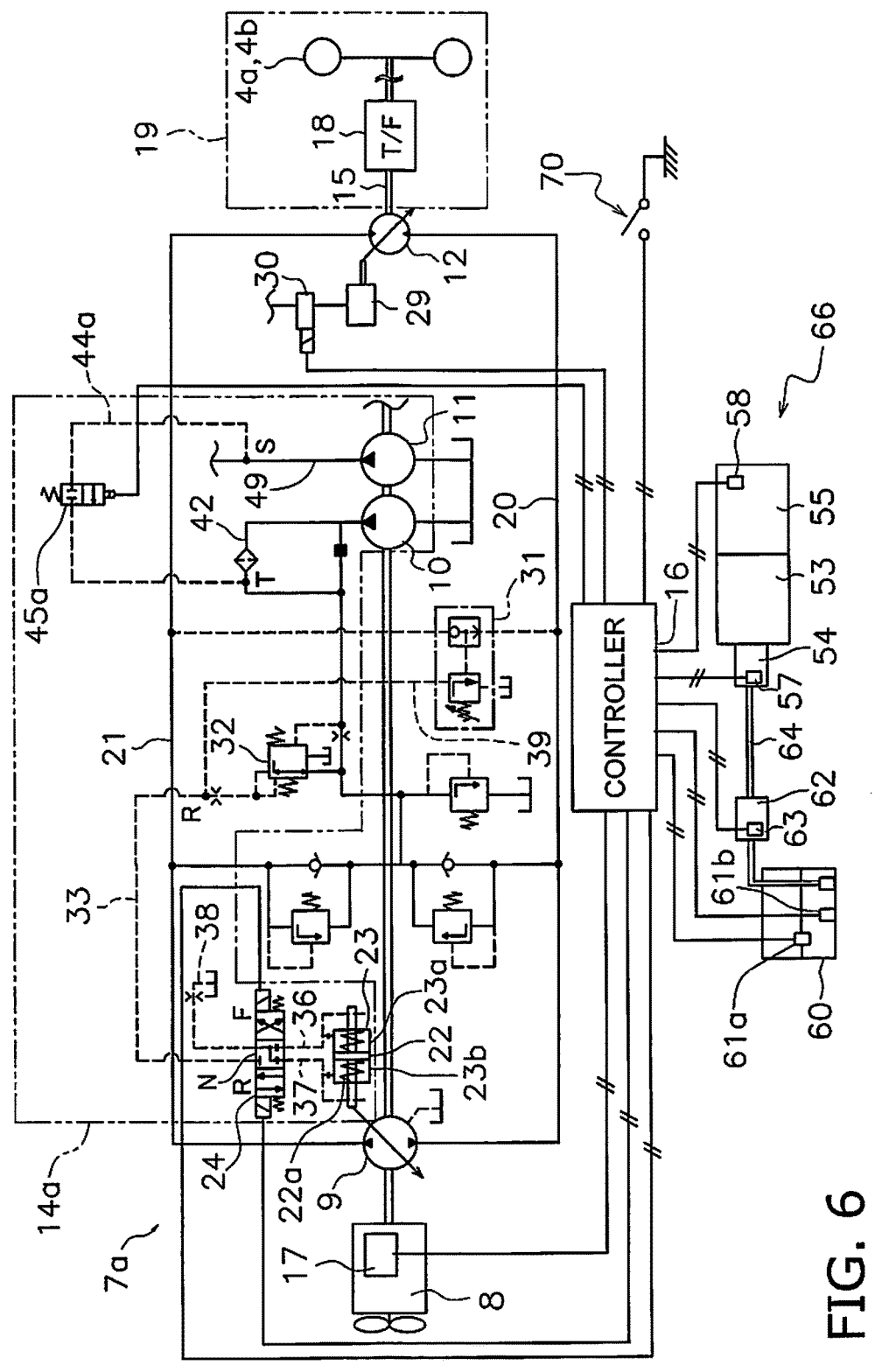

The hydraulic driving mechanism 7 is not limited to the configuration illustrated in FIG. 3. FIG. 6 is illustrates a configuration of an example modification to the hydraulic driving mechanism. In FIG. 6, the hydraulic driving mechanism 7a according to the modification example includes a pump control circuit 14a (corresponding to the hydraulic circuit in the Claims). The pump control circuit 14a may include a second bypass hydraulic path 44a, and a second on-off valve 45a instead of the first bypass hydraulic path 44, and the first on-off valve 45 in the hydraulic driving mechanism 7, respectively. The throttle 46 included in the hydraulic driving mechanism 7 may be omitted from the pump control circuit 14a; the pump control circuit 14a may instead be configured to include a working-implement hydraulic pump (or an auxiliary hydraulic pump) 11. Besides these modifications, the configuration of the pump control circuit 14a is identical to that of the pump control circuit 14 and thus an explanation therefor is omitted.

The second bypass hydraulic path 44a connects the working-implement circuit 49 and the charge circuit 42. The second bypass hydraulic path 44a connects the working-implement hydraulic pump 11 and the charge circuit 42 via the working-implement circuit 49. The working-implement hydraulic pump 11 supplies hydraulic oil to the pump control circuit 14a, and acts as an auxiliary hydraulic pump different from the charge pump 10.

The second bypass hydraulic path 44a is provided with a second on-off valve 45a. The flow path of the second on-off valve 45a is normally closed. That is, the second on-off valve 45a is normally closed. When the controller 16 detects that the operation member 70 is turned on (i.e., is operated), the controller 16 sends a command signal that opens the flow path of the second on-off valve 45a. That is the second on-off valve 45a opens. At this point, the hydraulic oil discharged from the working-implement hydraulic pump 11 flows from the working-implement circuit 49 through the second bypass hydraulic path 44a into the charge circuit 42. As a result, this raises the hydraulic pressure applied to the charge circuit 42 compared to when the hydraulic oil is discharged from just the charge pump 10.

When the hydraulic pressure applied to the charge circuit 42 rises, the pressure applied to the engine sensing valve 32 also rises, increasing the pilot pressure as illustrated by the dotted line in FIG. 4 compared to when just the first on-off valve 45 is closed. That is, the pressure of the hydraulic oil supplied to the pump control valve 24 increases. Consequently, adjusting the discharge capacity of the working-implement hydraulic pump 11 allows the pilot pressure to be controlled to establish the pilot pressure at the above-described PH even when the engine speed is at the low idle speed Ni. Accordingly, the hydraulic driving mechanism 7a in the modification example is also capable of changing the discharge capacity of the travel hydraulic pump 9 to the capacity Cp to establish the vehicle speed at or above a predetermined speed v when the reductant supply route 66 gets into an abnormal state.

Note that while the working-implement hydraulic pump 11 discharges hydraulic oil to the second bypass hydraulic path 44a in the above-described modification example, any pump driven by the engine 8 other than the charge pump 10, and the working-implement hydraulic pump 11 may discharge hydraulic oil to the second bypass hydraulic path 44a. A throttle may also be provided separately to the second bypass hydraulic path 44a for adjusting the hydraulic pressure applied to the charge circuit 42.

A portion of the sensors 63, 57, 58, 61a, 61b may be omitted from the above-described exemplary embodiment and modification example. Different sensors required from monitoring the reductant supply route 66 may also be added. For instance, a sensor and the like may be provided separately for detecting whether or not the reductant supply pipe 64 is properly connected.

The steps 1, 4 may be omitted from the operations of the work vehicle 1 illustrated in FIG. 5. The above-described operation member 70 is not limited to a switch, and may be another type of component, such as a button, or a lever, or the like.

Proposed is a work vehicle capable of travel even when the engine speed is set to low idle when the reductant supply route gets into an abnormal state.

The invention claimed is:

1. A work vehicle comprising:
an engine;
a variable displacement hydraulic pump configured to discharge hydraulic oil when driven by the engine;
a hydraulic motor driven by the hydraulic oil discharged from the variable displacement hydraulic pump;
a traveling apparatus driven by the hydraulic motor;
an exhaust treatment device configured to treat exhaust from the engine;
a reductant supply route supplying a reductant to the exhaust treatment device;
a controller configured to set an engine speed to a low idle when the reductant supply route gets into an abnormal state; and
an operation member configured to instruct a change of a discharge capacity of the variable displacement hydraulic pump so that a travel speed of the traveling apparatus becomes a predetermined non-zero speed or greater when the reductant supply route is in the abnormal state.

2. The work vehicle according to claim 1, further comprising
a hydraulic circuit configured to change the discharge capacity of the variable displacement hydraulic pump; and
a fixed displacement hydraulic pump driven by the engine, the fixed displacement hydraulic pump being configured to supply hydraulic oil to the hydraulic circuit.

3. The work vehicle according to claim 2, wherein
the hydraulic circuit includes an engine sensing valve configured to convert a hydraulic pressure of the hydraulic oil discharged from the fixed displacement hydraulic pump into a hydraulic pressure corresponding to the engine speed.

4. The work vehicle according to claim 3, wherein
the hydraulic circuit further includes
a pump capacity control cylinder configured to change the discharge capacity of the variable displacement hydraulic pump; and
a pump control valve configured to supply hydraulic oil to the hydraulic chamber of the pump capacity control cylinder to actuate the pump capacity control cylinder.

5. The work vehicle according to claim 4, wherein
the hydraulic circuit further includes
a first hydraulic path connecting the fixed displacement hydraulic pump and the engine sensing valve; and
a second hydraulic path connecting the engine sensing valve and the pump control valve.

6. The work vehicle according to claim 2, wherein
the hydraulic circuit is configured such that when the operation member is operated while the reductant supply route is in the abnormal state, the hydraulic circuit changes the discharge capacity of the variable displacement pump so that the travel speed of the traveling apparatus becomes the predetermined non-zero speed or greater.

7. The work vehicle according to claim 6, wherein
the hydraulic motor is a variable displacement motor, and
a capacity of the hydraulic motor decreases when the operation member is operated.

8. A work vehicle comprising:
an engine;
a variable displacement hydraulic pump configured to discharge hydraulic oil when driven by the engine;
a hydraulic motor driven by the hydraulic oil discharged from the variable displacement hydraulic pump;
a traveling apparatus driven by the hydraulic motor;
an exhaust treatment device configured to treat exhaust from the engine;
a reductant supply route supplying a reductant to the exhaust treatment device;
a controller configured to set an engine speed to a low idle when the reductant supply route gets into an abnormal state;
an operation member configured to indicate a change of a discharge capacity of the variable displacement hydraulic pump so that a travel speed of the traveling apparatus becomes a predetermined speed or greater when the reductant supply route is in the abnormal state;
a hydraulic circuit configured to change the discharge capacity of the variable displacement hydraulic pump, the hydraulic circuit including
an engine sensing valve configured to convert a hydraulic pressure of the hydraulic oil discharged from the fixed displacement hydraulic pump into a hydraulic pressure corresponding to the engine speed,
a pump capacity control cylinder configured to change the discharge capacity of the variable displacement hydraulic pump,
a pump control valve configured to supply hydraulic oil to the hydraulic chamber of the pump capacity control cylinder to actuate the pump capacity control cylinder,
a first hydraulic path connecting the fixed displacement hydraulic pump and the engine sensing valve,
a second hydraulic path connecting the engine sensing valve and the pump control valve, and
a first bypass hydraulic path branched from the first hydraulic path and connected to the second hydraulic path without passing through the engine sensing valve; and a fixed displacement hydraulic pump driven by the engine, the fixed displacement hydraulic pump being configured to supply hydraulic oil to the hydraulic circuit.

9. The work vehicle according to claim 8, wherein
the hydraulic circuit further includes a first on-off valve provided on the first bypass hydraulic path.

10. The work vehicle according to claim 9, wherein
the hydraulic circuit further includes a throttle provided on the first bypass hydraulic path between the first on-off valve and the second hydraulic path.

11. The work vehicle according to claim 9, wherein
the flow path of the first on-off valve is opened to increase a pressure of the hydraulic oil supplied to the pump control valve when the operation member is operated.

12. A work vehicle comprising:
an engine;
a variable displacement hydraulic pump configured to discharge hydraulic oil when driven by the engine;
a hydraulic motor driven by the hydraulic oil discharged from the variable displacement hydraulic pump;
a traveling apparatus driven by the hydraulic motor;
an exhaust treatment device configured to treat exhaust from the engine;
a reductant supply route supplying a reductant to the exhaust treatment device;
a controller configured to set an engine speed to a low idle when the reductant supply route gets into an abnormal state;
an operation member configured to indicate a change of a discharge capacity of the variable displacement hydraulic pump so that a travel speed of the traveling apparatus becomes a predetermined speed or greater when the reductant supply route is in the abnormal state;
a hydraulic circuit configured to change the discharge capacity of the variable displacement hydraulic pump, the hydraulic circuit including
an engine sensing valve configured to convert a hydraulic pressure of the hydraulic oil discharged from the fixed displacement hydraulic pump into a hydraulic pressure corresponding to the engine speed,
a pump capacity control cylinder configured to change the discharge capacity of the variable displacement hydraulic pump,
a pump control valve configured to supply hydraulic oil to the hydraulic chamber of the pump capacity control cylinder to actuate the pump capacity control cylinder,
a first hydraulic path connecting the fixed displacement hydraulic pump and the engine sensing valve, and
a second hydraulic path connecting the engine sensing valve and the pump control valve;
a fixed displacement hydraulic pump driven by the engine, the fixed displacement hydraulic pump being configured to supply hydraulic oil to the hydraulic circuit; and
an auxiliary hydraulic pump different from the fixed displacement hydraulic pump, the auxiliary hydraulic pump being driven by the engine, the auxiliary hydraulic pump being configured to supply hydraulic oil to the hydraulic circuit,
the hydraulic circuit further including a second bypass hydraulic path connecting the auxiliary hydraulic pump and the first hydraulic path.

13. The work vehicle according to claim 12, wherein
the hydraulic circuit further includes a second on-off valve provided on the second bypass hydraulic path.

14. The work vehicle according to claim 13, wherein
the flow path of the second on-off valve is opened to increase a pressure of the hydraulic oil supplied to the pump control valve when the operation member is operated.

15. A method of controlling a work vehicle comprising the steps of:
detecting whether a reductant supply route supplying reductant to the exhaust treatment device gets into an abnormal state;
setting the engine speed to a low idle when the reductant supply route gets into the abnormal state; and
changing a discharge capacity of the variable displacement hydraulic pump so that a travel speed of the traveling apparatus becomes a predetermined non-zero speed or greater when the reductant supply route gets into the abnormal state.

\* \* \* \* \*